June 7, 1949.　　　　　E. L. HUDSPETH　　　　　2,472,212
METHOD OF LOCATING BEACONS

Filed July 9, 1945

INVENTOR.
EMMETT L. HUDSPETH
BY
*William D. Hall*
ATTORNEY

Patented June 7, 1949

2,472,212

UNITED STATES PATENT OFFICE 2,472,212

METHOD OF LOCATING BEACONS

Emmett L. Hudspeth, Cambridge, Mass., assignor, by mesne assignments, to the United States of America as represented by the Secretary of War Application July 9, 1945, Serial No. 604,027

2 Claims. (Cl. 343—5)

This invention relates to energy beam reflectors, and more particularly to reflectors formed by two flat sheets of electrically conductive material which meet at an angle to form a corner. Such a reflector, hereinafter referred to as a diplane, is adapted to reflect an impinging beam of radiant energy back toward its source in such a manner as to impart a readily identifiable characteristic to the reflected beam. Thus a reflector of this character may be utilized as a marker for use with a radio object-locating system.

In its most general aspect, the diplane herein comprises two plane metallic sheets disposed at an angle (90° or less) with each other to form a corner. Incident wave energy travelling in a plane of propagation bisecting the corner angle is directively reflected in the same plane. If the incident energy is polarized in the above-mentioned plane of propagation, or at right angles thereto, there is no shifting of the plane of polarization of the energy on reflection. However, if the energy is polarized at an angle of 45° to the plane bisecting the corner angle, it is reflected with a 90° shift in polarization.

These characteristics make a diplane particularly advantageous as a target marker for use in conjunction with a radio object-locating system, such as for returning a strong signal to an aircraft or ship having a transmitting and receiving antenna adapted to transmit and receive either vertically or horizontally polarized energy, and to transmit vertically polarized energy and receive horizontally polarized energy or vice versa. Furthermore, a signal returned by a diplane is easily distinguishable from the depolarized energy (having an angular shift of polarization) returned by land and sea targets and what is included in the terms "ground clutter" and "sea clutter."

It is the principal object of the present invention to provide a simple and inexpensive device which is adapted to reflect a highly directional beam of energy which is not depolarized on reflection.

It is another object of the invention to provide a reflector adapted to reflect a beam of incident energy and to shift the plane of polarization of the incident energy under certain conditions by a predetermined angle, preferably of 90°.

Other objects and advantages of the invention will become apparent as the description proceeds.

Figure 1:
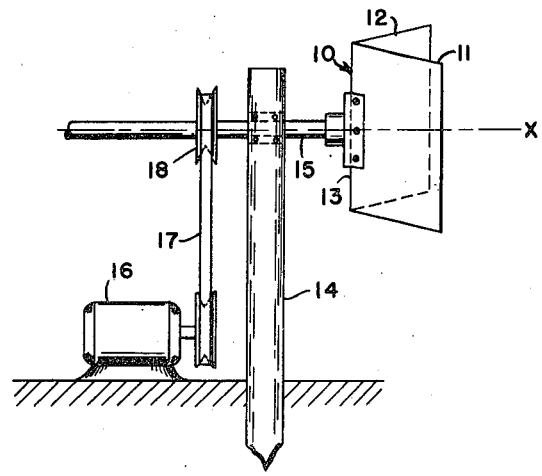
Fig. 1 is a side elevation view of the diplane and supporting structure according to one embodiment of the present invention.
Figure 2:
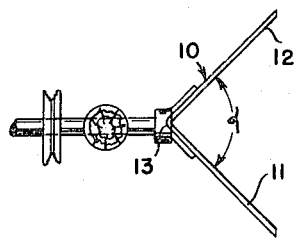
Fig. 2 is a top plan view of the same.

Referring to Fig. 1, there is shown a diplane 10 comprising two plane reflecting members or sheets 11 and 12 meeting at an angle along a line or common boundary 13. The members 11 and 12 may be perpendicular to each other, or the angle $\alpha$ formed by their reflecting surfaces may be more although preferably less, than 90°. The reflecting surfaces of members 11 and 12 are of appropriate character for the efficient reflection of one or several desired types of radiant energy, more particularly energy having wavelengths of the order of centimeters.

The size and character of the reflecting surfaces of members 11 and 12 are of course determined by the kind or kinds of energy beams it is desired to reflect. The general rule for efficient reflection is that the dimensions of the surface should be large, and irregularities in the surface should be small (i. e., the surface should be smooth) as compared to the wavelength of the energy to be reflected. Thus, for short waves highly polished surfaces are desirable, while for longer waves, a course mesh of copper wire or other conducting material may be entirely satisfactory.

The diplane 10 is supported in any suitable manner, such as by an upstanding pedestal 14. Pedestal 14 may be secured to any suitable base, for example, by driving pedestal 14 into the ground, setting in concrete or securing to a metallic base, a buoy or other conventional marker. Pedestal 14 may, if desired, be mounted to rotate about its axis or diplane 10 may rotate about the axis of pedestal 14, so that diplane 10 may be adapted to reflect incident energy from any direction in azimuth.

According to one embodiment of the invention, diplane 10 is mounted in any suitable manner to rotate relative to its supporting means. One means of rotating diplane 10 is shown by way of example in Fig. 1 in which a shaft 15 is mounted near the upper end of pedestal 14 in any suitable manner so that shaft 15 is free to rotate about its axis, the axis being generally perpendicular to the longitudinal axis of pedestal 14. One end of shaft 15 is secured to a rear portion of diplane 15, preferably at the approximate center of line 13. Any suitable means may be provided for rotating diplane 10 such as by motor 16 having a driving connection, through belt 17, to a pulley 18 fixed on shaft 15.

Figure 3:
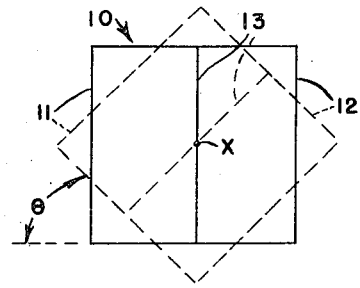
Fig. 3 is a front elevation of the diplane.

For purposes of facilitating illustration it may be assumed that diplane 10 is an isolated beacon normally in a vertical position as shown in Figs. 1 and 3 and capable of rotation at a constant speed about its axis $x$. It is also assumed that a radio-object locating system is adapted to transmit and receive high frequency waves of electromagnetic energy which impinge on diplane 10 in a plane bisecting the dihedral angle $\alpha$ formed by members 11 and 12. In the vertical position of diplane 10, vertically polarized incident energy will be reflected without polarization change and a strong reflected signal will be received by the receiving apparatus of the system. As diplane 10 rotates about axis $x$, the strength of the received signal varies with the angular position of diplane 10 as illustrated in solid lines in Fig. 4, the signal strength being a maximum for the horizontal and vertical positions of diplane 10 corresponding to the perpendicular and parallel positions of line 13 relative to the plane of polarization of the incident energy. This holds true where the incident energy is either horizontally or vertically polarized and the transmitting and receiving apparatus have antennas adapted to transmit and receive energy of the same polarization.

Figure 4:
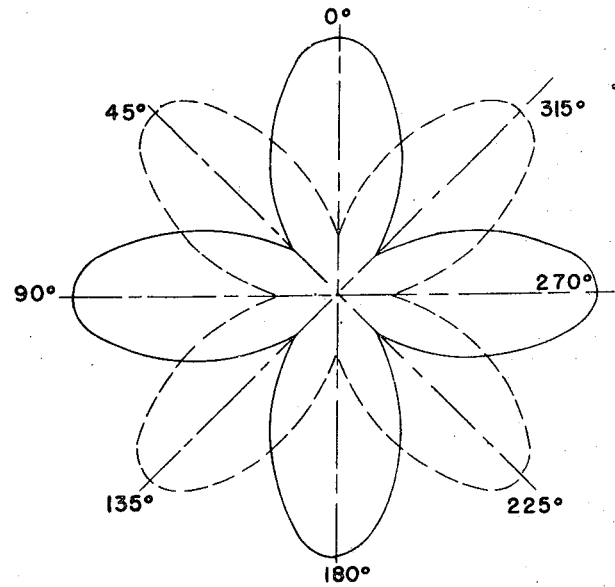
Fig. 4 is a polar diagram showing the intensity of a signal returned by the diplane of Figs. 1, 2, and 3 as a function of the angle through which the diplane is rotated.

If, however, the transmitting apparatus is vertically polarized and the receiving apparatus is horizontally polarized or vice versa, the solid line configuration of Fig. 4 is shifted by 45° as shown by the pattern in broken lines. This is due to the fact that, as diplane 10 is rotated through an angle $\theta$ with the horizontal, the electric vector is rotated through an angle $2\theta$. Thus when the incident wave is transmitted vertically, and when $\theta=45°$, the electric vector of the return wave is horizontal. For this reason, the plane of polarization is shifted 90° when the diplane is at angles of 45° relative to the plane of polarization of the incident energy.

By rotating diplane 10 about axis $x$, the signal returned thereby to, and shown on an indicator of, a radio object-locating apparatus will fluctuate in intensity at a frequency four times that of the rate of rotation of diplane 10. In this way, an operator of a radio object-locating system, located for example in an airplane, can readily observe the position of the point marked by diplane 10 by comparison with other fixed signals such as may be returned by wooded areas, buildings, or other fixed objects. In view of this, one particularly useful application of this invention would be in the marking of a runway for an aircraft landing field.

According to another embodiment of the invention diplane 10 may be mounted as described hereinbefore, but in fixed angular relation, rather than rotatable, to its supporting means. Thus diplane 10 may be positioned with line 13 forming an angle $\theta=45°$ to the horizontal plane. With the diplane 10 in this position, for example, on a buoy, a radio object-locating system transmitting with vertical polarization and receiving with horizontal polarization or vice versa would be greatly sensitive to signals returned by the diplane since the polarization of the incident energy is shifted by 90° on reflection. Sea return signals, or so called "ground or sea clutter," shift the polarization of the reflected energy a relatively small amount and hence would affect the receiving apparatus a negligible amount. Even in rough seas or in heavily wooded or built-up areas a diplane reflector as described provides a very outstanding marker for navigation of ships or aircraft.

One important advantage of the diplane according to this invention is that signals returned by the diplane to a radio object-locating system can be readily distinguished from signals returned by other fixed or movable objects even though the latter signals may be of equal or stronger intensity than those returned by the diplane. This is achieved by comparison of the returned signals on an indicator such as a cathode ray tube. For example, signals may be transmitted with vertical polarization and received by antennas adapted to receive both vertical and horizontal polarization. By known means, the returned signals may be passed through a comparison device, the output strength of which will depend upon the excess of strength of signals of one polarity over those of the other, and then pass to the indicator. If the diplane is adapted to shift the polarization by 90°, the returned signal therefrom will be horizontally polarized and may be made to appear as a strong positive signal on the indicator. On the other hand, signals returned by other objects will be vertically polarized or have a non-uniform angular shift of polarization. Such signals will partially or completely cancel each other and may appear as negative or weak positive signals on the indicator.

The reflecting surfaces of diplane 10 may obviously be of such size and character as to efficiently reflect all known types of energy waves (i. e., light and "radio") so that the navigator may employ any type of exploratory energy beam he may have available, or alternatively they may be designed to efficiently reflect only one particular type of wave, and indeed, even only one particular range of wavelengths of a particular type of wave, if so desired, whereby only navigators employing the appropriate type of exploratory beam would detect the presence of the reflector. Alternatively a particular arrangement of selectively reflecting devices can be employed to convey additional information as to location to navigators employing several types or even several wavelengths of a given type of exploratory beams.

The structure as hereinbefore described may therefore be employed to enable navigators to determine whether they are on one side or the other of a particular plane and by obvious arrangements of such reflectors, navigation in relatively narrow channels, such as the navigation of aircraft through mountain passes, can be made much less hazardous. Such reflectors can also obviously be disposed so as to enable aviators to determine their approximate altitudes when near the earth and for numerous other analogous purposes.

As will be understood diplane 10, with the two reflecting members 11 and 12 meeting each other at right angles, will reflect back in the direction of approach, only such waves as impinge upon it from directions normal to the common axis or line 13. Such a diplane will obviously be valuable in enabling navigators to determine when they are within the area delimited by particular boundary planes, the boundary planes obviously being at right angles to the aforementioned line of meeting of members 11 and 12 and located at the respective ends thereof. The "back" surfaces of members 11 and 12 are preferably made non-reflecting or dispersive to avoid any possible confusion which might result from reflection of waves which chanced to be normally incident to such back surfaces.

It is possible that instances will arise in which combinations of dispersive and reflecting structures may be employed to advantage to provide greater contrast between areas from which it is intended that reflection be obtained and the surrounding areas. In some cases too, it may be more desirable to absorb in whole, or in part, the incident energy beam rather than disperse it. Absorption where desired may be attained by methods well known to the art and not directly related to the present invention.

The above are merely illustrative of preferred embodiments of the invention, and it will be understood that the invention is capable of various other modifications and improvements. Therefore, it is not desired that the scope of the invention be limited to the precise details set forth.

What is claimed is:

1. In an environment characterized by background objects that shift the polarization of a plane polarized wave a negligible amount, the method of locating a beacon reflector remotely positioned from a transmitter and disposed among said background objects, which method comprises transmitting a plane polarized wave of electromagnetic energy, shifting the plane of polarization of said energy through 90° by means of said beacon, and detecting said energy so shifted in polarization.

2. In an environment characterized by background objects that shift the polarization of a plane polarized wave a negligible amount, the method of locating a beacon reflector remotely positioned from a transmitter and disposed among said background objects, which method comprises transmitting a plane polarized wave of electromagnetic energy, continuously shifting the plane of polarization of said wave by rotating said diplane beacon, and detecting said energy so shifted in polarization.

EMMETT L. HUDSPETH.

REFERENCES CITED

The following references are of record in the file of this patent:

UNITED STATES PATENTS

| Number | Name | Date |
| --- | --- | --- |
| 1,384,014 | Fessenden | July 5, 1921 |
| 2,014,688 | Mabboux | Sept. 17, 1935 |
| 2,153,209 | Scharlau | Apr. 5, 1939 |
| 2,212,110 | Beuermann | Aug. 20, 1940 |
| 2,272,839 | Hammond, Jr. | Feb. 10, 1942 |
| 2,412,320 | Carter | Dec. 10, 1946 |

FOREIGN PATENTS

| Number | Country | Date |
| --- | --- | --- |
| 668,231 | Germany | Nov. 28, 1938 |